United States Patent [19]

Trozpek

[11] Patent Number: 4,954,700
[45] Date of Patent: Sep. 4, 1990

[54] PATHLENGTH CONTROL SYSTEM WITH DEFORMABLE MIRROR HAVING LIQUID-FILLED HOUSING

[75] Inventor: Ludd A. Trozpek, Claremont, Calif.

[73] Assignee: Rockwell International Corporation, El Segundo, Calif.

[21] Appl. No.: 383,674

[22] Filed: Jul. 24, 1989

[51] Int. Cl.$^5$ ................................................ G01J 1/20
[52] U.S. Cl. .................................. 250/201.9; 350/608
[58] Field of Search .................... 250/201.9; 350/607, 350/608, 611

[56] References Cited

U.S. PATENT DOCUMENTS

| | | | |
|---|---|---|---|
| 4,033,676 | 7/1977 | Brantley | 350/608 |
| 4,059,346 | 11/1977 | Levine | 350/608 |

Primary Examiner—David C. Nelms
Assistant Examiner—Sherrie Hsia
Attorney, Agent, or Firm—H. Fredrick Hamann; George A. Montanye; Tom Streeter

[57] ABSTRACT

A liquid filled pathlength control device is disclosed that responds to a pathlength control signal for adjusting the pathlength in an optical signal process dependent on coherent light. The liquid filled pathlength control device has a housing containing a liquid filled chamber. The liquid filled chamber has an extendable wall having an inner surface subject to pressure from the liquid. An external mirrored surface on the extendable wall is inserted into and the light path. The liquid filled chamber has a deformable wall having an inner surface subject to the pressure of the liquid and an external surface. A displacement transducer is coupled to the deformable wall and responds to a control signal of a first polarity to deflect the internal surface of the deformable wall in a first direction to increase the pressure of fluid in the chamber. The displacement transducer responds to a control signal of a second polarity to deflecting the internal surface of the deformable wall in a second direction to decrease the pressure of fluid in the chamber. A control means samples coherent light from the light path and provides a control signal to the displacement transducer to optimize the intensity of the beam. A transducer responds to fluid pressure within the liquid filled chamber to provide a signal proportional to the chamber pressure and therefore proportional to the mirror displacement.

6 Claims, 6 Drawing Sheets

PATHLENGTH CONTROL SYSTEM WITH DEFORMABLE MIRROR HAVING LIQUID-FILLED HOUSING

BACKGROUND OF THE INVENTION

1. Field of the Invention

This invention relates to the field of laser instruments and more particularly to the field of systems used to control and to peak the response of a laser signal source such as the signal output from a ring laser gyro.

2. Prior Art

Pathlength control assemblies typically have a frame or body with a flat mounting surface on which a multilayer dielectric mirror is centrally formed. The flat surface is typically bonded to an end or corner of an optical cavity in a laser or ring laser gyro body to reflect light passing through the cavity incident on the mirrored surface. The mirrored surface is typically formed on thin wall that serves as a diaphragm to permit slight motion of the mirrored surface within the cavity. A PZT (piezoelectric transducer) is driven with an electrical control signal to move the diaphragm to thereby shorten or lengthen the optical pathlength to optimize the resonance of the cavity. The diaphragm surface is mechanically coupled by a link or a rod to a surface on the opposite side of the frame or body that is displaced by the piezoelectric transducer.

Configurations of this type typically exhibit hysteresis that is inherent in the material from which the PZT devices are made. A control signal of a first amplitude to the PZT will produce a first deflection that will not be matched by an equivalent deflection in the opposite direction by removal of the signal and reapplication of a signal of equal value and opposite polarity to the PZT. A signal of opposite polarity and larger amplitude is required to overcome the hysteresis in the PZT. Therefore; the drive signal to the PZT device is not linearly related to the deflection of the mirror surface in such prior art pathlength control devices.

SUMMARY OF INVENTION

It is an object of this invention to provide a pathlength control apparatus that will provide a signal that is linearly related to the pathlength deflection distance that the mirror is translated through in the process of controlling the output of a laser instrument.

It is a second object of the invention pathlength control apparatus to reduce the complexity of the pathlength control apparatus by eliminating the conventional thrust pin, link pins for locking one end of the thrust pin to the diaphragm inner surface and also eliminating the conventional collar and adjusting screw typically used to preload the diaphragm or extendable inner surface.

These objects are realized in a pathlength control apparatus for adjusting the pathlength of an optical path to optimize an optical signal process dependent on coherent light in which the pathlength control apparatus has a liquid filled chamber. The liquid filled chamber has an extendable external surface that is oriented to receive the light beam.

A displacement transducer, having a movable surface internal to the chamber, is coupled to the liquid filled chamber and responds to an electrical control signal of a first polarity to deflect the movable surface in a first direction to increase the pressure of the fluid in the liquid filled chamber. The displacement transducer responds to an electrical control signal of a second polarity to deflect the movable surface in a second direction to decrease the pressure of the fluid in the liquid filled chamber.

The extendable external surface is perpendicular to the central axis of the pathlength control apparatus and has a mirrored surface affixed to the extendable surface. The light beam is incident on the mirrored surface. The extendable surface is moved by variations in the pressure to control the pathlength of the light beam. The central axis of the pathlength control apparatus is typically coplanar with the light path of a laser gyro and coaxial in a linear laser.

A pressure transducer is mounted to sense the pressure of the liquid in the liquid filled chamber and provides an electrical signal that is linearly related to the pressure in the liquid filled chamber and also to the displacement of the mirrored surface.

A control circuit samples coherent light from the light path and provides a control signal to optimize said optical process.

PREFERRED EMBODIMENT

Figure 1:
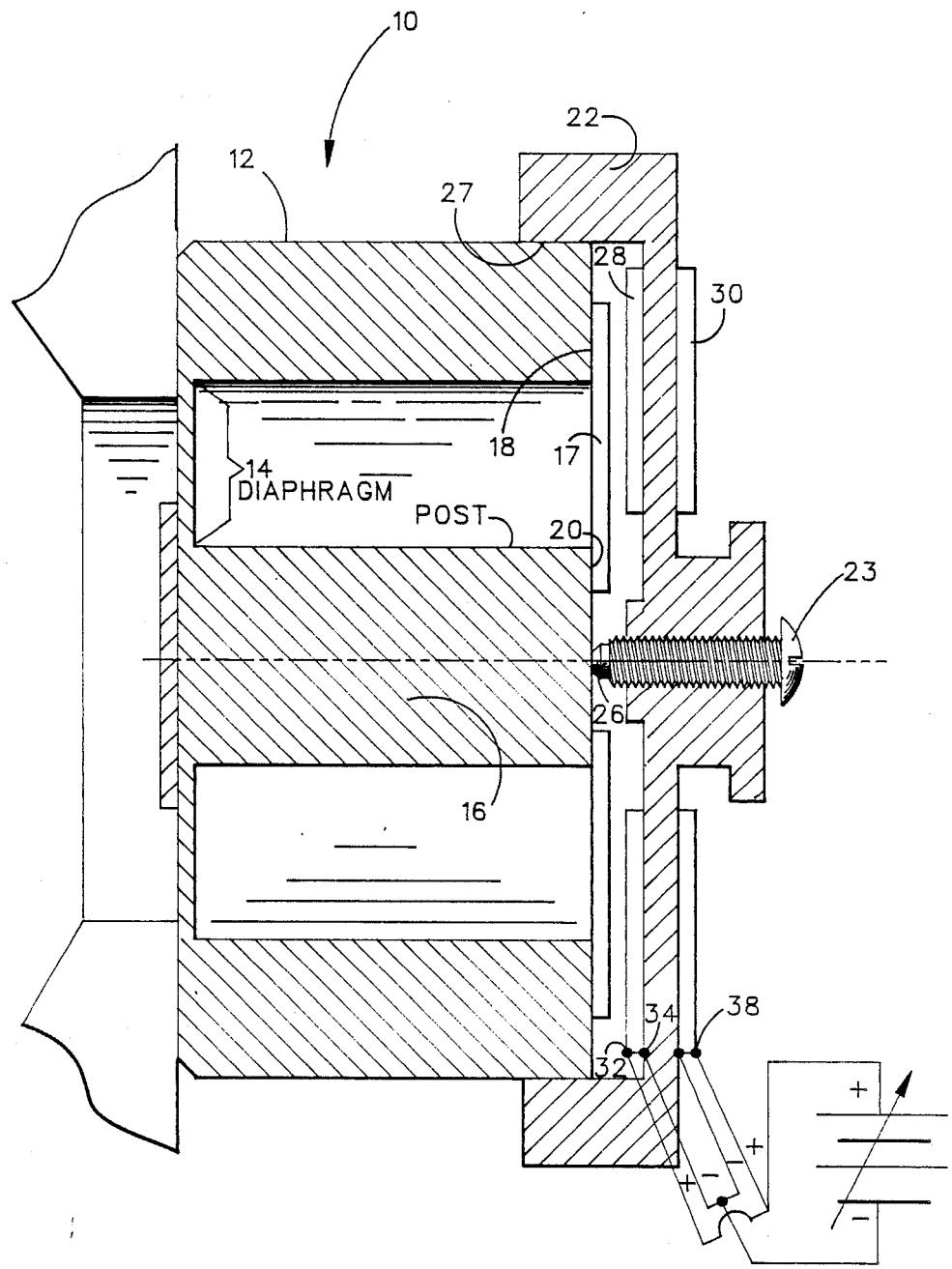
FIG. 1 is a sectional view of a prior art pathlength control apparatus.

FIG. 1 shows a conventional pathlength control apparatus (PLC) 10 in section. The housing 12 is typically formed from ZERODUR, a type of glass having a low thermal coefficient of expansion. The housing is shaped as a cylindrical cup having a base that functions as a first diaphragm 14. A cylindrical post 16 extends vertically from the base 14. A glass washer 17 is bonded to the housing rim 18 and to the post top 20 to operate as a bridge support to the structure.

A metal cap 22 is tapped to receive screw 23. The screw has a rounded tip 26 to facilitate rotary motion of the rounded tip against the top of post 16. The screw 23 is advanced into the threaded cap to apply a compressive force against the top of post 16. The force applied is transferred via cap 22 to the outer rim 27 of housing 12.

The displacement transducers such as piezoelectric transducer (PZT) 28 and 30 are washer shaped PZT devices that are typically formed from of a material such as lead-zirconate titanate. Each PZT has metalized surfaces on opposing sides. Connections are made to the PZT metalized surfaces to cause one PZT to expand, as the other is driven to contract.

A conventional pathlength control apparatus is designed to lengthen or shorten the pathlength of a tuned optical cavity in response to a control signal applied to the PZT terminals 38, 32. The control signal is not linearly related to the change in wave length because the PZT devices have hysteresis.

Figure 2:
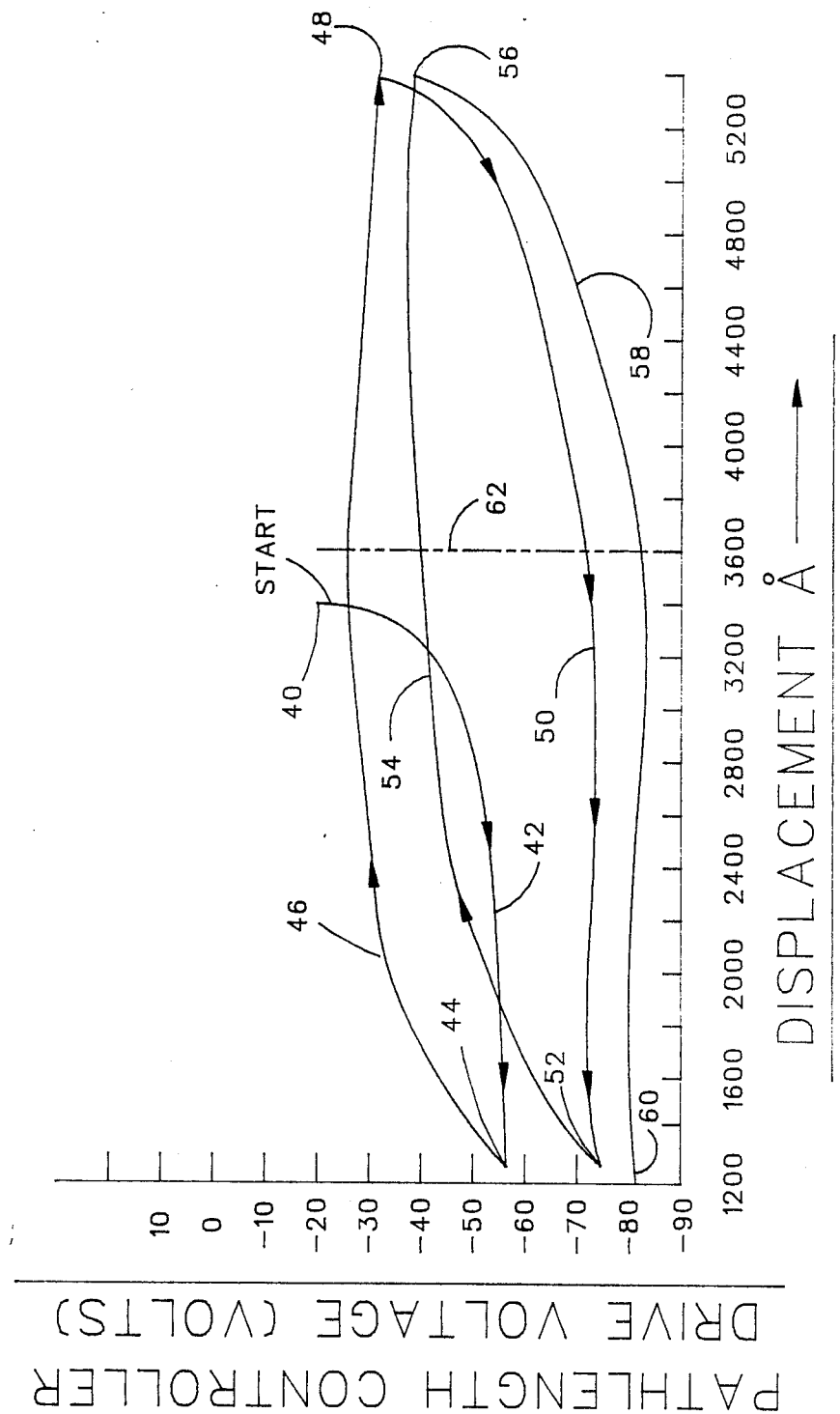
FIG. 2 is a graph showing pathlength controller drive voltage in volts as a function of pathlength controller displacement in wavelength expressed in angstroms.

FIG. 2 illustrates the nonlinear relationship between the control voltage applied to the PZT in a PLC and the change in displacement or pathlength that accompanied the control voltage as a ring laser gyro was operated through a series of five temperature changes. The curves of FIG. 2 show that the displacement of the mirror provided by the PLC increases and decreases to accommodate corresponding and opposite changes in the pathlength of the cavity as temperature is changed.

The test started at point 40. As the system was warmed up, the control voltage followed path 42 to point 44 as the drive voltage increased from approximately 25 volts to 62 volts. The compensating displacement decreased from 3400 angstroms to 1250 angstroms during the same period.

The temperature of the chamber was then changed which required the control loop to decrease the control voltage as the curve advanced along path 46 to point 48 with a corresponding increase of compensating displacement to approximately 5400 angstroms.

The temperature of the test chamber was then cycled again. The control loop again automatically increased the drive voltage to approximately 75 volts as the curve followed path 50 to point 52.

The oven temperature was then recycled and the control loop again decreased the drive voltage to the PZT to approximately 35 volts while following path 54 to point 56 at 5400 angstroms. The temperature was then recycled to cause the drive voltage to follow values corresponding to path 58 as the test was terminated at point 60.

The family of curves of FIG. 2 show that the control loop accommodates a substantial amount of hysteresis in the system. A dotted vertical line 62, drawn from any value of displacement, in the region of control, crosses multiple values of PZT drive voltage. The value of drive voltage required for a particular displacement, therefore, depends on the history of the drive voltage that is applied to PZT. In a path length control system, such as the system of FIG. 1, the PZT drive voltage is the only analog signal that provides an indication of the displacement provided by the PLC; however, the hysteresis introduced by the properties of the PZT make this signal unusable.

Figure 3:
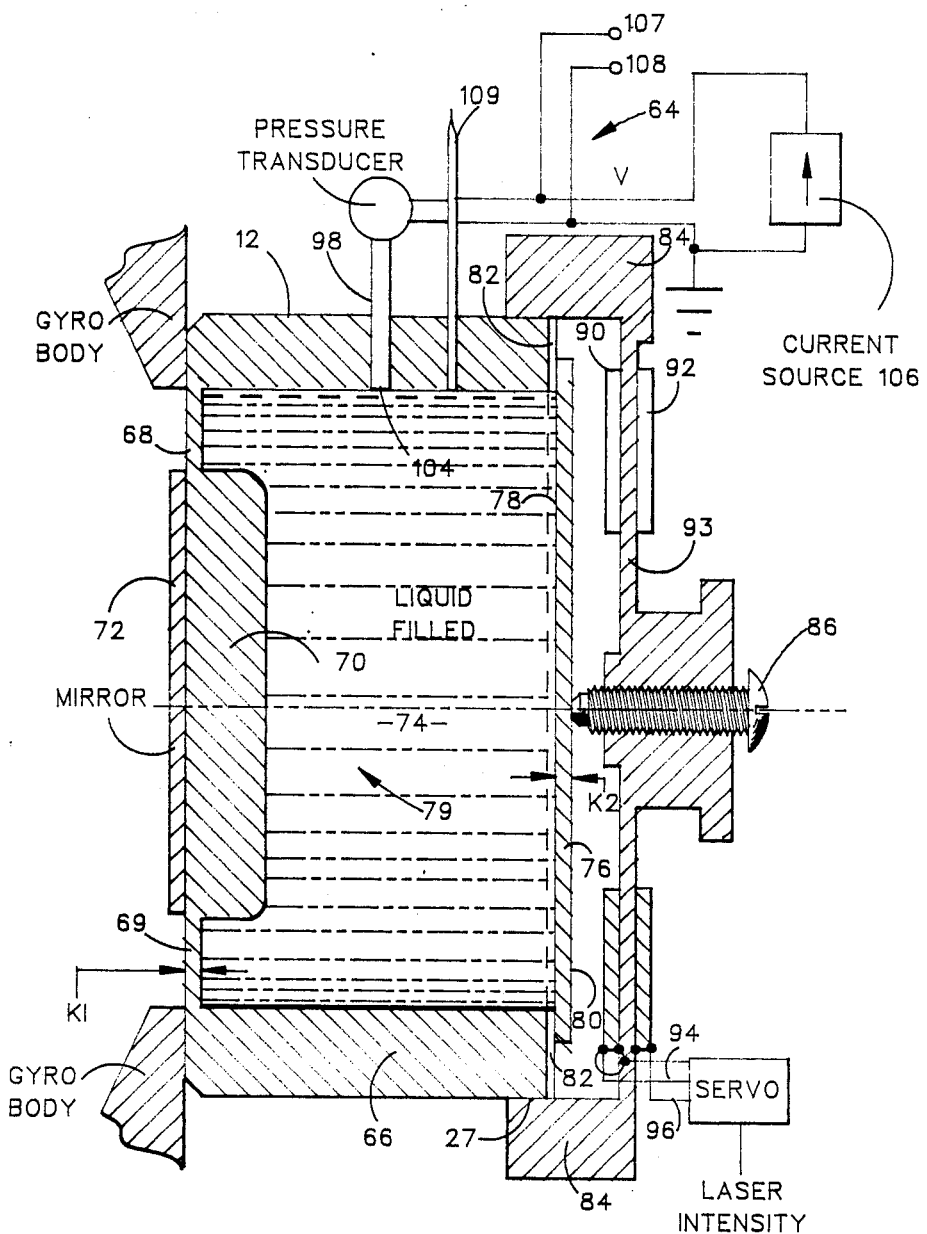
FIG. 3 is a is a sectional view of the invention liquid filled pathlength control apparatus.

FIG. 3 shows the invention, i.e. the liquid filled PLC 64. The housing 66 is also typically formed from ZERODUR, a type of glass having a low thermal coefficient of expansion. As in the case of the PLC of FIG. 1, the housing 64 is also shaped as a cylindrical cup having a thin base region or first diaphragm 68 with a web 69. A cylindrical post 70 extends vertically from the base to provide support to the mirror 72 on the external surface. Web 69 flexes to permit the diaphragm to move the mirror in response to a change of fluid pressure in the liquid filled chamber 74.

The liquid filled chamber 74 has a second diaphragm 76 formed by a thin a deformable wall having an inner surface 78 subject to the pressure of the liquid 79 and an external surface 80. The second diaphragm 76 is a typically a glass disc bonded to the housing rim 82. The web 69 of the first diaphragm and the thickness of the second diaphragm are typically 0.020–0.022 inches in thickness at dimensions K1 and K2 of FIG. 3.

The structure provided by a metal cap 84 is tapped to receive screw 86. The screw has a rounded tip 88 to facilitate rotary motion of the rounded tip against the outer surface of deformable wall 80. The screw 86 is advanced into the threaded cap to apply a compressive force against the outer surface of the second diaphragm. The screw is rotated to deform the second diaphragm 76 thereby increasing the pressure in the liquid filled chamber. As the pressure is increased. the liquid applies a larger force to the first diaphragm 68 thereby moving the mirror surface to the left to reduce the path length.

As in the case of FIG. 1, displacement transducers (PZT) 90 and 92 are washer shaped PZT devices. Each PZT has metalized surfaces on opposing sides. Connections are made to the PZT metalized surfaces to cause one PZT to expand as the other is driven to contract. Control signals to the PZT devices deflect the cap end wall 93 thereby driving screw 86 to deflect the deformable wall 76.

The control signal to the PZT in the case of the embodiment of FIG. 3 is not linearly related to the change in wave length because the PZT devices have hysteresis. However, motion of the mirror surface is related to flexure of the web 69 of first diaphragm 68. Since the deflection of the web 69 is constrained to small movements, the material of the web functions well within the elastic limit of the glass material. Over small regions of deflection, the relationship between the pressure driving the first diaphragm and the displacement distance of the diaphragm is linear.

The transducer 98, in FIG. 3, represents a transducer means that is responsive to fluid pressure within the liquid filled chamber 74 for providing a chamber pressure signal. The transducer is exposed to the pressure in the liquid filled cavity via a port 104. The transducer 98 is excited by a current source 106. Changes in pressure are indicated by corresponding changes in voltage between output terminals 107 and 108. An increase in pressure tends to extend the first diaphragm 68 to the left moving the surface of the mirror toward the light beam incident on its surface., thereby. reducing the pathlength.

Vent 109, in FIG. 3, is ported to the liquid filled chamber 74. The chamber is evacuated and then filled through port 104 for the transducer or through vent 109. The transducer is then installed leaving only vent 109 open. Vent 109 is then sealed. Screw 86 is advanced to pressurize the liquid filled chamber and pre-load the first and second diaphragms. The invention liquid filled PLC 64 is alternatively filled prior to the installation of the glass diaphragm 76. Housing 66 is then oriented with mirror surface 72 down. Liquid 79 is introduced into chamber 74 to form a meniscus at the rim of the chamber 74. Diaphragm 76 is then positioned and bonded on the rim 82 forcing the liquid to exit through port 104 or in the alternative slightly displacing or extending the first diaphragm 68. The transducer 98 is then positioned in the port and sealed.

A first displacement transducer. PZT 90 and a second displacement transducer, PZT 92 are ring shaped and are bonded to the inner surface and outer surface of the cap end wall 93. The PZTs respond to a control signal of a first polarity to deflect the surface of the deformable wall, such as second diaphragm 76 by deflecting metal cap end wall 93, in a first direction to increase the pressure of fluid in the chamber to extend said extendable surface, such as first diaphragm 68, a first direction. The first and second PZTs respond to a control signal of a second polarity to deflect the internal surface of the deformable wall, such as second diaphragm 76, in a second direction, to decrease the pressure of fluid in the chamber thereby retracting the second diaphragm.

Figure 4:
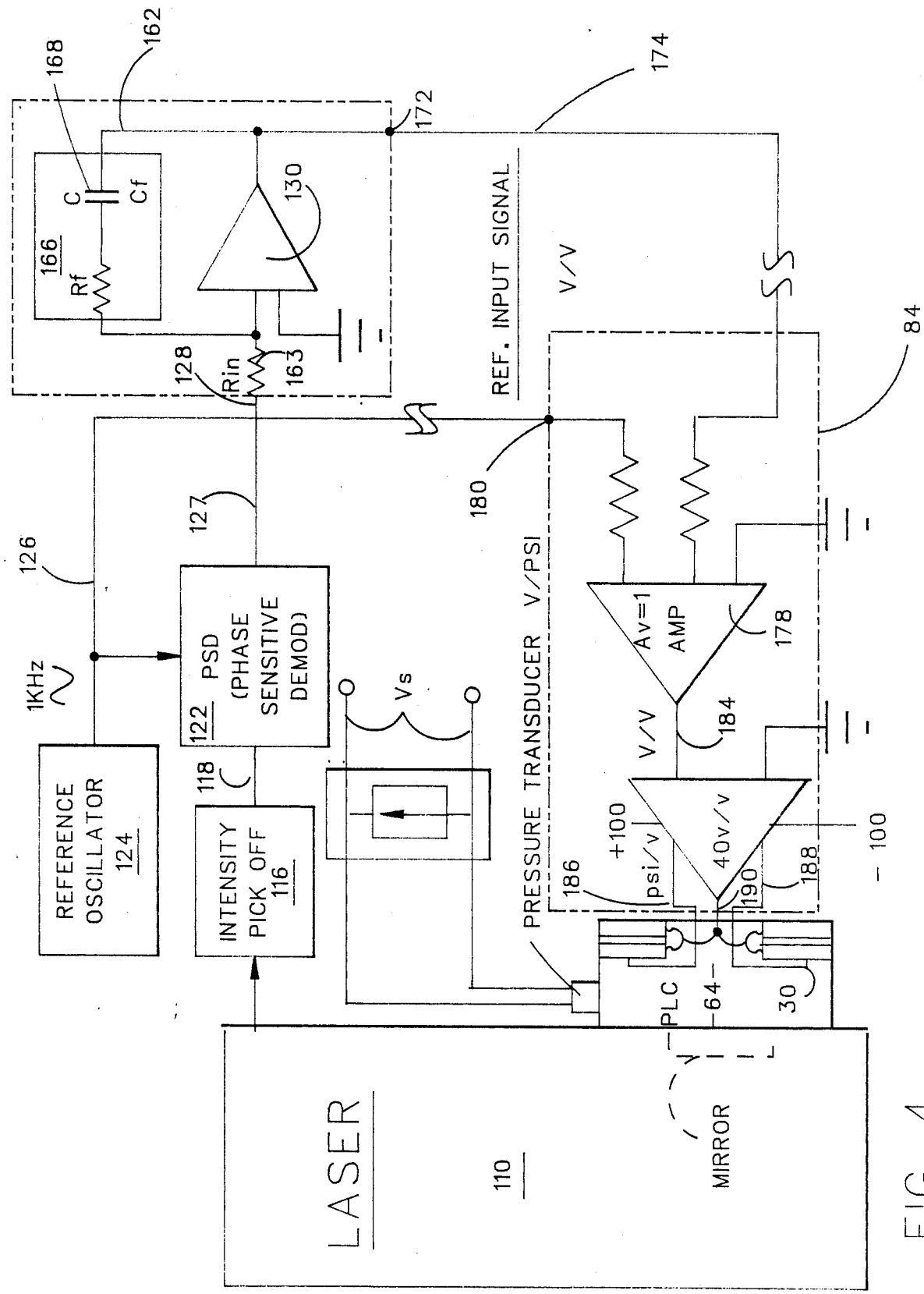
FIG. 4 is a block diagram of a control system for controlling the intensity of a laser.

FIG. 4 is a control system diagram for a typical control system for using the liquid filled PLC 64 to maintain the laser light 110 source at peak brilliance. The control system represents a control means for sampling coherent light from the light path via light path 112 and providing a control signal to the displacement transducer 90, 92 respectively to optimize the intensity of the beam.

The brightness of the beam varies as a function of the amplitude of a modulation signal that is superimposed on the control signal applied to the displacement transducers. The intensity pickoff 116 detects the low modulation signal in the light source on light path 112 and provides a detected signal on signal path 118. The intensity pickoff 116 typically comprises a light sensitive diode and a matched pre amp within a common integrated circuit that also contains circuit provisions for biasing the diode.

The modulated light source typically produces a modulation signal out of the light sensitive diodes within the intensity pickoff 116 in the range of 0.05–0.15 mVpp. The signal at the output of the intensity pickoff 116 on output signal line 118 is typically in the range of 0.05–0.15 Vpp.

Block 122 represents a phase sensitive "synchronous" demodulator circuit, (PSD), referenced to a low frequency modulation signal, such as the 1 KHz reference signal from the reference oscillator 124 on signal line 126.

The output of the phase sensitive demodulator (PSD) is filtered by a filter (not shown in FIG. 3) and then supplied via the PSD signal output line 127 to the input 128 of integrator circuit 130.

Figure 5:
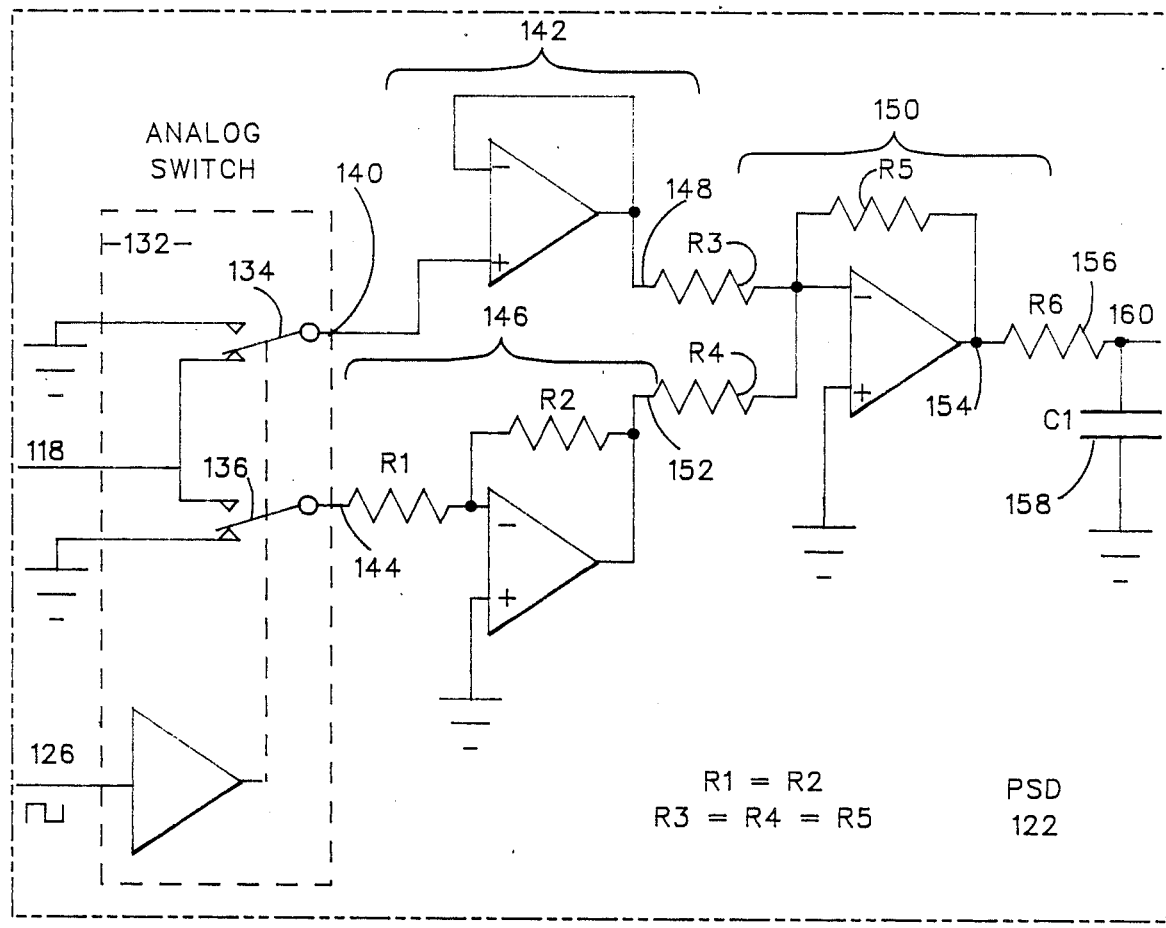
FIG. 5 is a schematic of a synchronous demodulator.

FIG. 5 is a schematic of a typical embodiment of a PSD circuit. Analog switch 132 contains a first synchronized switch 134 and a second synchronized switch 136. The first and second synchronized switches 134, 136 alternately transfer the non-inverting input 140 of voltage follower 142 and the inverting input 144 of inverting amplifier 146 between ground and the signal from the intensity pickoff on signal line 118. The non-inverting input and the inverting inputs are transferred on alternate phase intervals of the reference signal on reference oscillator signal line 126. Thus, the non-inverting input 140 and the inverting input 144 are grounded on alternate half phase intervals of the reference signal.

The first input 148 of summer 150 receives the output signal from the non-inverting amplifier 142 and the second input 152 of the summer 150 receives the output of the inverting amplifier 146. The sum of the two signals are provided at the summer output terminal 154.

If the input signal on signal line 118 is in phase with reference signal on signal line 126, a full wave rectified signal of a first polarity will be present at summer output terminal 154. If the signal on signal line 118 is exactly out of phase with the reference signal on signal line 126, a full wave rectified signal of an opposite polarity will be present at the summer output terminal 154. The low pass filter formed by R6, 156 and Cl, 158 filter a substantial amount of ripple out of the signal present at the PSD output terminal 160.

The gain of a PSD is typically 2/pi. The gain of PSD is obtained by considering the result of driving the input of a PSD circuit with an input signal that is of the form Sin(Theta). If the input signal is in phase with the reference, the output signal is that of a full wave rectifier. The average value of a full wave rectified waveform is equal to 2/pi which is obtained by integrating Sin(Theta)d(Theta) from 0 to pi and then dividing the result by pi. The angle pi is the interval over the independent variable "Theta" for which the function was integrated. The average value thus obtained is 2/pi.

The filter comprised of R5, 156 and Cl, 158 on the output of the PSD adds another pole to the open loop gain characteristic of the control loop. The filter is designed to remove high frequency components of signal noise and therefore only introduces a small amount of phase shift in the low frequency range of interest.

Referring again to FIG. 4, phantom block 162 contains an integrator circuit with input resistor Rin 163 for integrating the signal from the output terminal 160 of the PSD.

Figure 6:
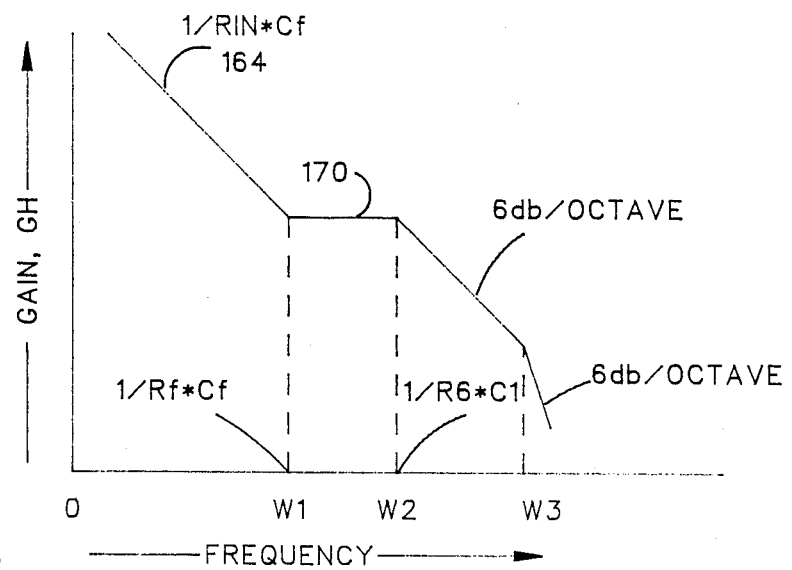
FIG. 6 is a straight line graph showing the approximate shape of the gain of the forward loop characteristic, GH, with respect to frequency.

FIG. 6 shows a straight line approximation of the log-log gain versus frequency response of the open loop characteristic of the control loop of FIG. 4. The slope of the first curve associated with reference number 164 is 1/(Rin*Cf). A zero is introduced at a first break frequency at w1 which occurs at a frequency of 1/(Rf*Cf). The zero is introduced by the presence of feedback resistor Rf. 166 in series with feedback capacitor Cf. 168. The slope of the second curve 170 is zero db per octave over region 170.

Referring again to FIG. 4, the integrated signal output from integrator output terminal 172 is coupled via signal line 174 to a control signal input 176 to a summing amplifier 178. A reference signal input is provided to the summing amplifier reference signal input 180.

The summing amplifier 178 adds the reference signal to the control signal to superimpose the reference signal on the control signal. The control signal modulated with the reference signal is coupled to the input of high voltage amplifier 182 via signal line 184. Complementary control signals are delivered to PZT 90 and PZT 92 within PLC 30. Return signal line 190 is a return for the complementary drive signals.

Figure 7:
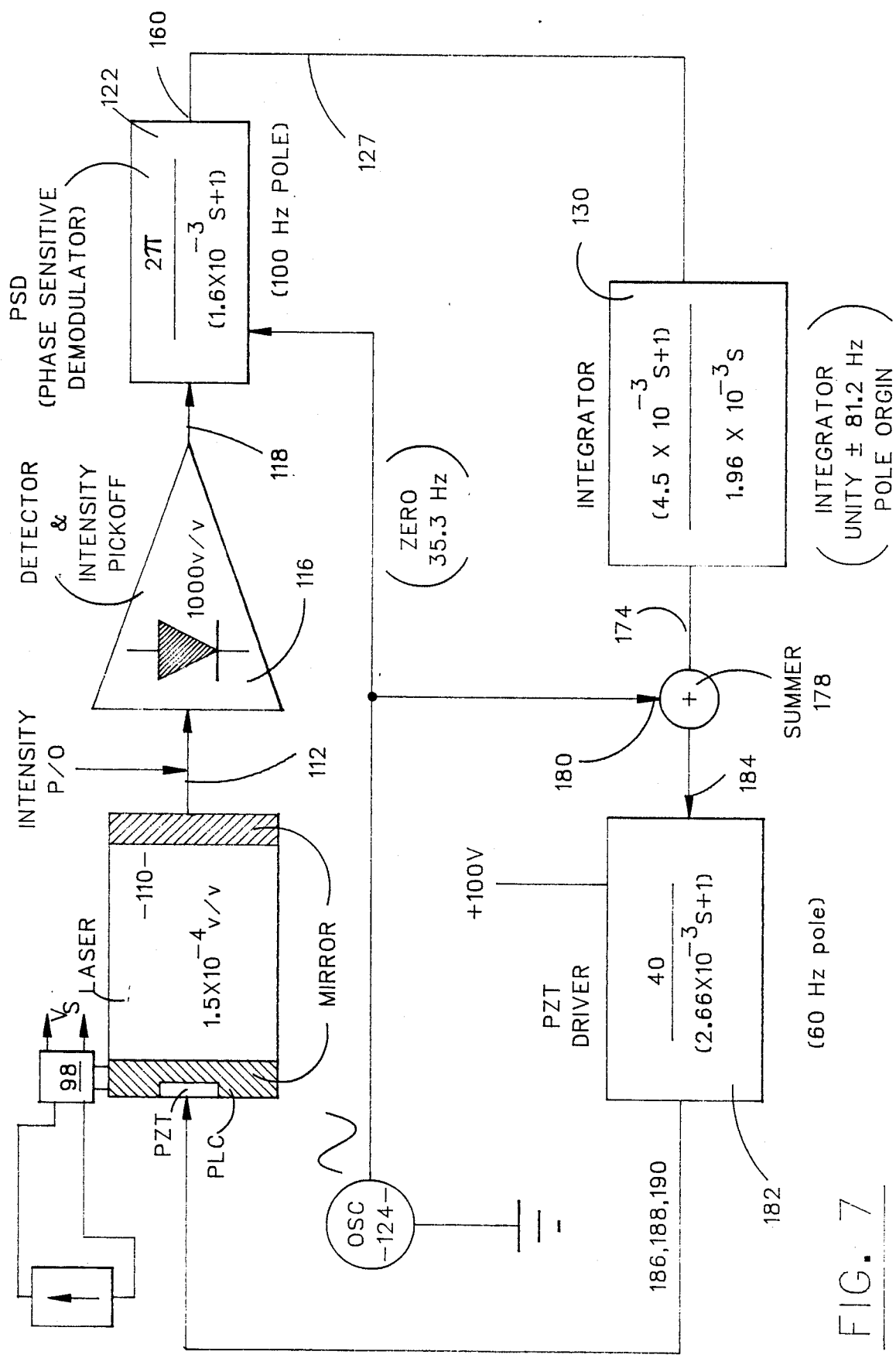
FIG. 7 is a block diagram characterizing the elements in FIG. 4 in terms of ratios of factored polynomials in "s" in a control system for controlling the pathlength of a laser.

FIG. 7 is a control system diagram showing a characterization of a control loop in terms of factored ratios of polynomials in "s" in which the invention PLC would be used. The control system diagram of FIG. 7 attempts to characterize the known frequency dependent elements in a control loop for peaking the intensity of a laser.

The numerator in the quotient in integrator block 130 in FIG. 7 represents zero or lead that is provided by the series combination of Rf 166 and Cf 168 shown in FIG. 4. The break frequency at which the zero or lead is introduced is set at approximately $1/Rf*Cf = 4.5 \times 10^{-3}$ radians per second.

Referring again to block 130 in FIG. 7, the denominator in the quotient provides the integrator function. The reciprocal of the coefficient of the "s" term in the denominator of $1.96 \times 10^{-3}$ represents the frequency at which the term will cross a gain of 1 or 0 db as the gain slopes downward at six db per octave. The slope of the integrator; therefore, crosses zero at a frequency of approximately $1/1.96 \times 10^{-3}$ radians per second.

Referring again to FIG. 7, the gain of the pickoff 116 is approximately 1000. The gain of the PSD 122 is 2/pi as discussed above in connection with FIG. 4. As shown in FIG. 5, the filter on the output of the PSD comprising resistor R6, 156 and capacitor C1, 158. This filter provides the pole in block 122 of FIG. 7. The pole provides a break frequency at approximately $1/1.6 \times 10^{-3}$ radians per second.

Block 182 represents the combination of the PZT devices and the high voltage amplifier 182. The PZT devices provide a pole at $1/2.66*10^{-3}$ radians per second. The two PZT devices resemble a capacitive load to the high voltage amplifier.

Reference oscillator 124 provides a synchronizing signal to the phase sensitive demodulator, PSD, of block 122 and to the reference signal input 180 of summing amplifier 178. The summing amplifier 178 is typically a unity gain amplifier that drives the high voltage amplifier 182.

Although the invention liquid filled pathlength control B apparatus has disclosed and illustrated in detail, it is to be understood that the same is by way of illustration, and as an example only, and is not to be taken by way of limitation. The spirit and scope of the invention is to be limited only by the terms of the appended claims.

What is claimed is:

1. A pathlength control system responsive to a pathlength control signal for adjusting a pathlength of a light beam in an optical signal process dependent on coherent light, the pathlength control system comprising:
   a housing containing a liquid filled chamber, said liquid filled chamber having an extendable wall having an inner surface subject to the pressure of the liquid and an external surface perpendicular to a central axis, the external surface having a mirrored surface for insertion into and control of the light path, the central axis being coaxial with the light path, the liquid filled chamber also having a deformable wall having an inner surface subject to the pressure of the liquid and an external surface;
   a displacement transducer, the displacement transducer being coupled to the deformable wall and responsive to a control signal of a first polarity for deflecting the internal surface of the deformable wall in a first direction to increase the pressure of fluid in the chamber to extend the extendable surface in a first direction,
   the displacement transducer being responsive to a control signal of a second polarity for deflecting said internal surface of the deformable wall in a second direction to decrease the pressure of fluid in the chamber to extend the extendable surface in a second direction;
   a control means for sampling coherent light from said light path and for providing said control signal to the displacement transducer to optimize the intensity of the beam; and
   a transducer means responsive to fluid pressure within the liquid filled chamber for providing a chamber pressure signal.

2. The pathlength control system of claim 1 wherein said control means further comprises:
   a reference oscillator means for supplying a reference oscillator signal at a reference oscillator frequency;
   sample means for extracting a sample of the coherent light and for detecting and supplying an error signal at the reference oscillator frequency;
   phase sensitive demodulator means responsive to the error signal and to the reference signal for providing a phase demodulated error signal with respect to a voltage reference., and,
   integrator means responsive to said phase demodulated error signal for integrating the phase demodulated signal with respect to said voltage reference to provide the control voltage to the displacement transducer.

3. The pathlength control system of claim 1 wherein the transducer means further comprises:
   a current source for providing a fixed current;
   a pressure transducer responsive to the liquid pressure within the chamber and to the fixed current source for providing a transducer signal voltage proportional to the pressure within the chamber.

4. The pathlength control system of claim 1 wherein said control means further comprises:
   a cap coupled to the housing;
   a screw, the cap being drilled and threaded to receive the screw, the screw being rotated to advance it to deform the deformable wall.

5. A path length control device comprising:
   a liquid filled housing having a first diaphragm and a second diaphragm, the first diaphragm having an external mirror surface for insertion into a light path; and,
   deforming means responsive to a control signal for deforming the second diaphragm in a first direction to increase the pressure within the liquid filled chamber thereby extending the first diaphragm.

6. The path length control device of claim 5 wherein the liquid filled housing further comprises:
   a pressure transducer means for providing an electrical signal voltage proportional to the pressure of the liquid within the liquid filled housing.

* * * * *